(12) United States Patent
Gratzer et al.

(10) Patent No.: US 7,753,173 B2
(45) Date of Patent: Jul. 13, 2010

(54) POWER DIVIDER FOR MOTOR VEHICLES AND LUBRICATION THEREOF

(75) Inventors: Franz Gratzer, Stallhofen (AT); Markus Kraxner, Graz (AT); Mario Vockenhuber, Graz (AT)

(73) Assignee: Magna Drivetrain AG & Co KG, Lannach (AT)

( * ) Notice: Subject to any disclaimer, the term of this patent is extended or adjusted under 35 U.S.C. 154(b) by 582 days.

(21) Appl. No.: 11/658,520

(22) PCT Filed: Jul. 26, 2005

(86) PCT No.: PCT/AT2005/000293

§ 371 (c)(1),
(2), (4) Date: Jun. 26, 2007

(87) PCT Pub. No.: WO2006/015394

PCT Pub. Date: Feb. 16, 2006

(65) Prior Publication Data

US 2008/0308354 A1    Dec. 18, 2008

(30) Foreign Application Priority Data

Jul. 26, 2004    (AT) .............................. GM527/2004

(51) Int. Cl.
*F16H 57/04*    (2010.01)
*F16H 48/20*    (2006.01)

(52) U.S. Cl. .................. 184/6.12; 184/6; 184/6.28; 184/6.5; 184/13.1; 74/606 A; 74/606 R; 192/35; 192/70.23; 192/70.24; 192/84.961; 192/93 A; 477/35; 477/36; 475/199; 475/233

(58) Field of Classification Search ............... 184/6.12, 184/13.1; 192/70.23, 70.24, 35, 85 AA, 93 A; 74/606 A, 606 R; *F16H 57/04*
See application file for complete search history.

(56) References Cited

U.S. PATENT DOCUMENTS

| | | | |
|---|---|---|---|
| 3,095,758 A | 7/1963 | Bixby | |
| 4,531,421 A | 7/1985 | Vieth et al. | |
| 4,699,249 A | 10/1987 | Fujiura et al. | |
| 5,078,248 A * | 1/1992 | Yesnik | 192/84.961 |
| 5,688,202 A * | 11/1997 | Bowen | 475/199 |
| 2004/0176207 A1* | 9/2004 | Suydam et al. | 475/223 |
| 2005/0230213 A1* | 10/2005 | Puiu | 192/35 |

FOREIGN PATENT DOCUMENTS

| | | |
|---|---|---|
| DE | 19930804 A1 | 1/2001 |
| EP | 0268904 | 6/1988 |
| FR | 2744508 A1 | 8/1997 |
| JP | 10122340 A * | 5/1998 |
| RU | 2021918 C1 | 10/1994 |
| RU | 35288 U1 | 1/2004 |
| SU | 1055664 A1 | 11/1983 |

OTHER PUBLICATIONS

English Translation of the International Preliminary Report on Patentability for PCT/AT2005/000293, issued Jan. 30, 2007.

* cited by examiner

*Primary Examiner*—Robert A Siconolfi
*Assistant Examiner*—San Aung
(74) *Attorney, Agent, or Firm*—Harness, Dickey & Pierce, P.L.C.

(57) ABSTRACT

A power divider for motor vehicles includes a housing, a primary shaft and a secondary shaft, wherein a friction clutch having an outer part that is rigidly connected to the primary shaft, and an inner part, derives torque from the primary shaft and delivers the torque to the secondary shaft by means of the inner part and a displacement drive. To ensure a sufficient supply of lubrication oil under all conditions, an oil reservoir, which at least partially surrounds the ramp ring, is fixed in the housing between the coupling and the displacement drive. The base of the oil reservoir comprises at least one opening, which is adjacent to the upper part of the periphery of the ramp ring, and the oil reservoir has at least one guiding device that extends into the centrifugal area of the displacement drive, through which the centrifuged lubrication oil is received in the reservoir.

25 Claims, 3 Drawing Sheets

POWER DIVIDER FOR MOTOR VEHICLES AND LUBRICATION THEREOF

CROSS-REFERENCE TO RELATED APPLICATIONS

This application is a National Stage of International Application No. PCT/AT2005/000293, filed Jul. 26, 2005, and which claims the benefit of Austrian Utility Model No. GM 527/2004, filed Jul. 26, 2004. The disclosures of the above applications are incorporated herein by reference.

FIELD

The invention relates to a transfer case for motor vehicles comprising a housing, a primary shaft and a secondary shaft, with a friction clutch, which comprises an outer part rotationally fixedly connected to the primary shaft and an inner part, channeling off torque from the primary shaft and supplying it via the inner part and an offset drive to the secondary shaft, with two ramp rings, which can be rotated toward one another, being provided for the actuation of the clutch between it and the offset drive.

BACKGROUND

The statements in this section merely provide background information related to the present disclosure and may not constitute prior art.

Transfer cases are used in all-wheel drive vehicles for the splitting of the torque to a plurality of axles, in particular to the front axle and the rear axle. This is possible in different modes, for instance with a longitudinal differential lockable by a multiple disk clutch. A further mode includes the engagement of the connection to the secondary shaft which is usually associated with the front axle. On engagement by means of a controllable friction clutch, one speaks of "torque on demand".

The lubrication of transfer cases with their large height differences due to the offset drive and with the high cooling oil requirement of the friction clutch, above all in slip operation, usually requires a separate oil pump which is driven by the primary shaft and which has to be configured to the maximum lubricating oil demand with a slipping clutch due to the non-controllable drive. The power loss in the transfer case caused by the oil pump is thereby substantial.

A transfer case having a longitudinal differential and a multiple disk clutch is known from EP 268 904 in which oil should move from an annular space surrounding the primary shaft up to the clutch disposed far away while dispensing with an oil pump. A rotating collar is provided for this purpose whose cylindrical part has inwardly screw-shaped oil conveying beads. The annular space between the primary shaft and a hollow shaft which surrounds it and is part of the offset drive is long and narrow so that a sufficient and reliable oil supply is doubtful, in particular when the friction clutch is operated with slip for a longer time.

SUMMARY

It is thus the object of the invention to ensure a sufficient supply of lubricating oil under all conditions with a transfer case. This is achieved in accordance with the invention in that the lubricating oil is conveyed upwardly by the offset drive, is centrifuged toward the guide device, conducted through this into the oil reservoir in which a high oil level is adopted, and moves between the ramp rings through the first opening(s).

Since the ramp rings cannot rotate along (they rotate slowly around an angle of a maximum of approximately 90 degrees only with adjustment of the clutch), the lubricating oil can flow radially inwardly and so arrives at the lubrication points, these are the bearings of the shaft and the clutch, while amply supplying them.

In a further development of the invention, the oil reservoir has, in addition to the base, a front wall, a rear wall and an outer peripheral wall, with the guide devices being arranged at the front wall and the base having a slot as a first opening which adjoins both ramp rings with the interposition of seals so that lubricating oil moves between them. The high oil reservoir is a closed space in which no rotating parts are located so that no churning losses occur. The slot and the seals surrounding it ensure in cooperation with the high oil level in the oil reservoir that a lot of oil moves between the usually stationary ramp rings without much going to the side. Oil bores in the primary shaft can thereby be dispensed with.

Further pursuant to the idea of the invention, at least one second opening is close to the edge of the oil reservoir formed by the base and the rear wall, with the lubricating oil moving directly to the multiple disks of the clutch through the opening. For this purpose, the part of the clutch facing the at least one second opening has a rotating collection chamber and from this at least one outwardly inclined bore (47) leading to the multiple disk pack. The collection chamber extends close to the oil reservoir, collects the oil discharged from the second opening and conveyed by the axial needle bearing from where it is guided directly to the clutch disks by centrifugal force.

When the inner part of the clutch is rotationally fixedly connected to a hollow shaft leading to the offset drive by means of a clutch tooth arrangement, an advantageous further development includes individual teeth being missing from the tooth arrangement, whereby oil passages are created through which lubricating oil flows to radial passages in the inner clutch part which lead to the disks of the clutch. The lubricating oil is thus guided on a second path to the clutch disks located further away from the oil reservoir. In this connection, suction is exerted by the centrifugal force present in the radial passages and pulls the lubricating oil through the tooth spaces of the clutch teeth.

In a preferred further development, the outer peripheral wall of the oil reservoir projects beyond the rear wall into the centrifugal region of the clutch so that oil centrifuged out from the clutch enters into the oil reservoir. The oil level in the oil reservoir thereby becomes high and is held low in the sump of the offset.

The guide devices can be made differently within the framework of the invention. They have the task of collecting the lubricating oil conveyed by the offset drive and of deflecting its kinetic energy such that it flows to the oil reservoir in the axial direction. The guide devices can thus be a scoop or a plurality of scoops or a crescent-shaped chamber part adjoining the oil reservoir and is bounded at the outside by an extension of the outer peripheral wall, at the side remote from the clutch by an end wall and by an inner wall which is disposed in the centrifuging region of the offset drive and has openings for the collection of the centrifuged oil.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
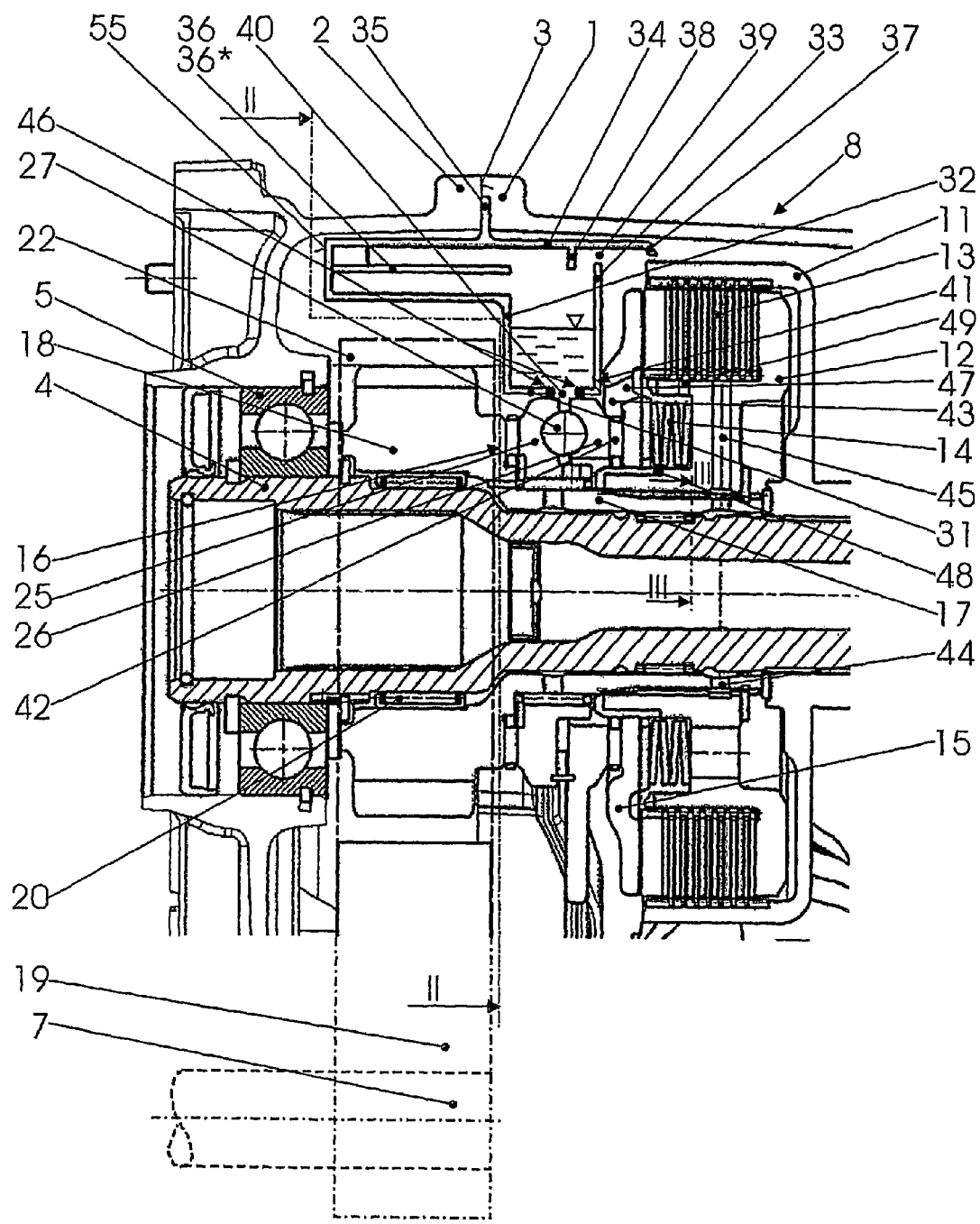
FIG. 1 illustrates a longitudinal section through a transfer case in accordance with the invention.

The following description is merely exemplary in nature and is not intended to limit the present disclosure, application, or uses. It should be understood that throughout the drawings, corresponding reference numerals indicate like or corresponding parts and features.

In FIG. 1, the elements of a transfer case are surrounded by a housing 1 and a housing cover 2 which are screwed together along a vertical joint 3. A primary shaft 4 journaled in the housing 1, 2 in a bearing 5 and in a no longer shown second bearing and a secondary shaft 7 arranged offset and in parallel (only indicated) are located in the interior, the secondary shaft being journaled further down in the housing 1, 2. The primary shaft 4 is here simultaneously an input shaft and an output shaft with respect to a driven axle, usually the rear axle. A shaft (not shown) leads from the secondary shaft 7 to a second driven axle, usually the front axle. To allow the torque taken up via the secondary shaft 7 to be channeled off from the primary shaft 4 in a controllable manner, a friction clutch 8 is attached concentrically to the primary shaft.

The friction clutch 8 is a multiple disk clutch which comprises a bell-shaped outer coupling part 11 rotationally fixedly connected to the primary shaft 4 and an inner coupling part 12 rotationally fixedly connected to a toothed wheel 18 via a hollow shaft 17. A disk pack 13 is located in a known manner in the interior of the outer part 11 of the clutch 8, as is a spring pack 14, here radially inside the disk pack 13. Furthermore, an actuator 16 is provided which here comprises two ramp rings 25, 26 rotatable toward one another by an adjustment drive, not shown, with a number of balls 27 therebetween. The latter convert a relative rotation into an axial displacement of a pressure plate 15 of the clutch. The unit supported on the primary shaft 4 by means of needle bearings 20 and comprising the hollow shaft 17 and the first toothed wheel 18 is drive-connected via a toothed chain 22 to a second toothed wheel 19 on the secondary shaft 7. The two toothed wheels 18, 19 and the toothed chain 22 form an offset drive. Toothed wheels meshing with one another can also be provided instead of the toothed chain.

The oil reservoir accommodated in the upper region of the housing 1, 2 is a thin-walled hollow body which is formed by a base 31, a front wall 32, a rear wall 33 and an outer peripheral wall 34. The base 31 is substantially cylindrical and follows the outer contour of the ramp rings 25, 26 over a specific arch length. The front wall 32 and the rear wall 33 are approximately in axial normal planes and crescent-shaped. The outer peripheral wall 34 is part of a cylinder, the whole oil reservoir 30 is suspended at it by means of lugs 35 which are clamped in the joint 3 between the housing parts 1, 2. Guide devices generally designated by 36 extend from the front wall 32 into the conveying region, in particular the centrifuging region, of the offset drive 18, 19 which can have a toothed chain 22 or can only comprise toothed wheels. Possible embodiments of the guide device 36 are described with reference to FIG. 2. The outer peripheral wall 34 extends to the rear beyond the rear wall 33 up to the outer coupling part 11, with passages 39 existing between it and the rear wall 33. This extension collects lubricating oil centrifuged out from the clutch 8 and guides it into the oil reservoir 30. For this purpose, a deflection rib 38 is provided at the interior of the outer peripheral wall 34.

The base 31 of the oil reservoir 30 has a series of first openings 30 or a slot 40 through which lubricating oil flows between the ramp rings 25, 26. If the first opening 40 is a slot extending in the peripheral direction, it can be sealed on one side or on both sides with respect to the ramp rings 25, 26. Because the ramp rings 25, 26 only rotate at times and then slowly, no high demands have to be made on the seals 46. At least one second opening 41 (preferably also a slot) is provided in the proximity of the intersection of base 31 and rear wall 33 through which opening oil likewise flows out of the oil reservoir 30. The pressure plate 15 of the clutch 8 extends very close toward the rear wall 33 and has a rotating collection chamber 43. Slightly outwardly inclined bores 47 lead from this into the interior of the clutch. The centrifugal force conveys lubricating oil into the clutch through the inclination of the bores 47.

The lubricating oil entering between the ramp rings 25, 26 from the first openings 40 or the slot respectively flows inwardly past the balls 27, moves to the needle bearings and into the space in which the plate springs 14 are located. The inner clutch part 12 has grooves 48 milled in for this purpose. The lubricating oil moves to the disk pack 13 over different paths. First, the needles of the needle bearing 42 act as conveyor vanes which centrifuge oil into the rotating collection chamber 43 in the pressure plate 15; second, oil also flows from the space of the plate springs 14 through further bores 49 to the disk pack; and third, lubricating oil moves to clutch teeth 44 which establish the connection between the inner clutch part 12 and the hollow shaft 17 to radial passages 45 which establish the connection to the disk pack 13 of the clutch 8, in the manner to be described with respect to FIG. 3, and thus provide an abundant cooling flow.

Figure 2:
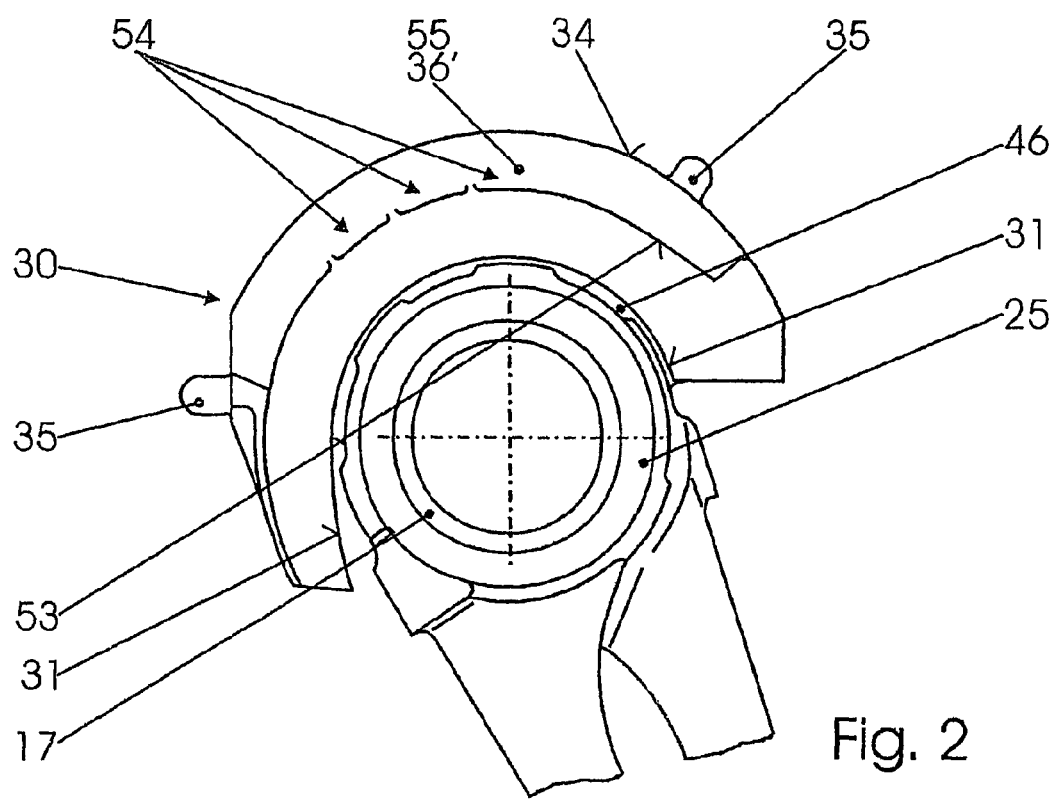
FIG. 2 illustrates a section according to II-II in FIG. 1, first embodiment.

The crescent-shaped design of the oil reservoir 30 can be recognized in FIG. 2. It can comprise sheet metal or a suitable plastic. The guide device generally designated by 36 forms the upper part of the crescent in this view with an approximately cylindrical inner surface 53 extending over the offset drive. The inner surface has a number of axially directed slots 54 into which the oil conveyed by the offset drive enters and thus moves into the oil reservoir 30.

Figure 3:
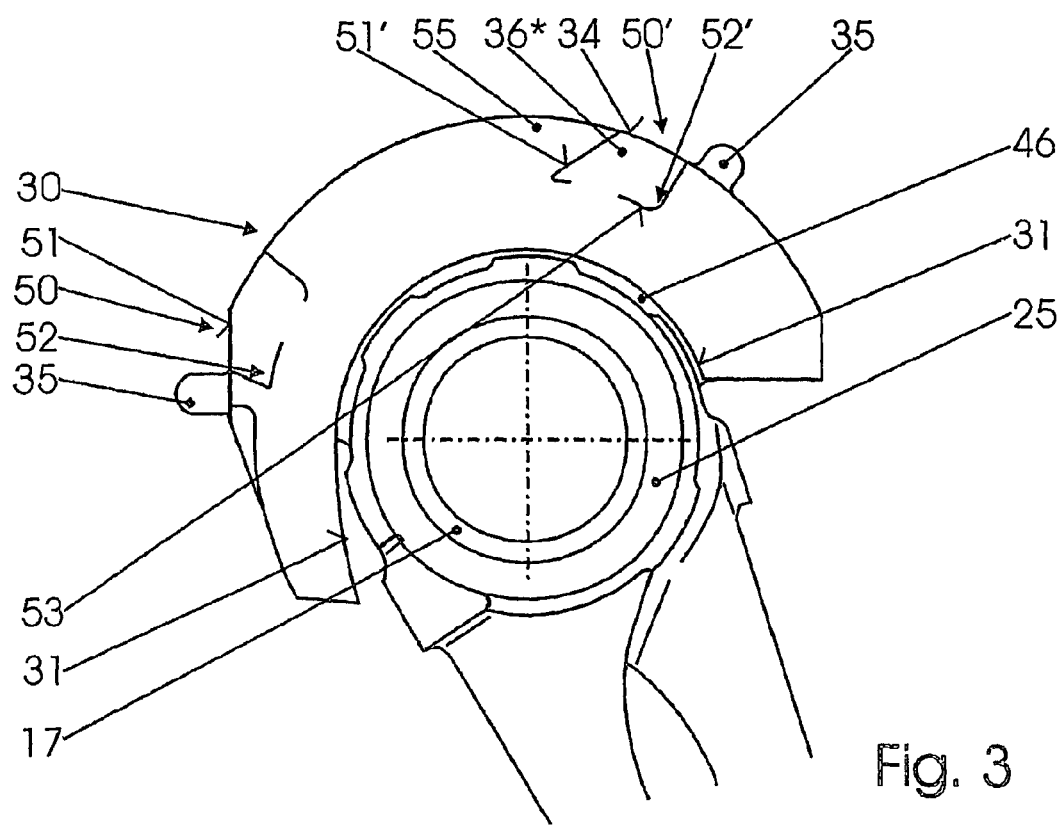
FIG. 3 illustrates a section according to II-II in FIG. 1, second embodiment.

In the variant of FIG. 3, the guide devices 36* are individual scoops 50 of which 2 are drawn in. Each of the cross-sections 50, 50' is parallelepiped shaped or trapezoidal in cross-section and forms an impact wall 51 and a channel 52. The impact wall 51 collects the conveyed lubricating oil, the optionally inwardly crimped channel 52 guides it, into the oil reservoir 30.

Figure 4:
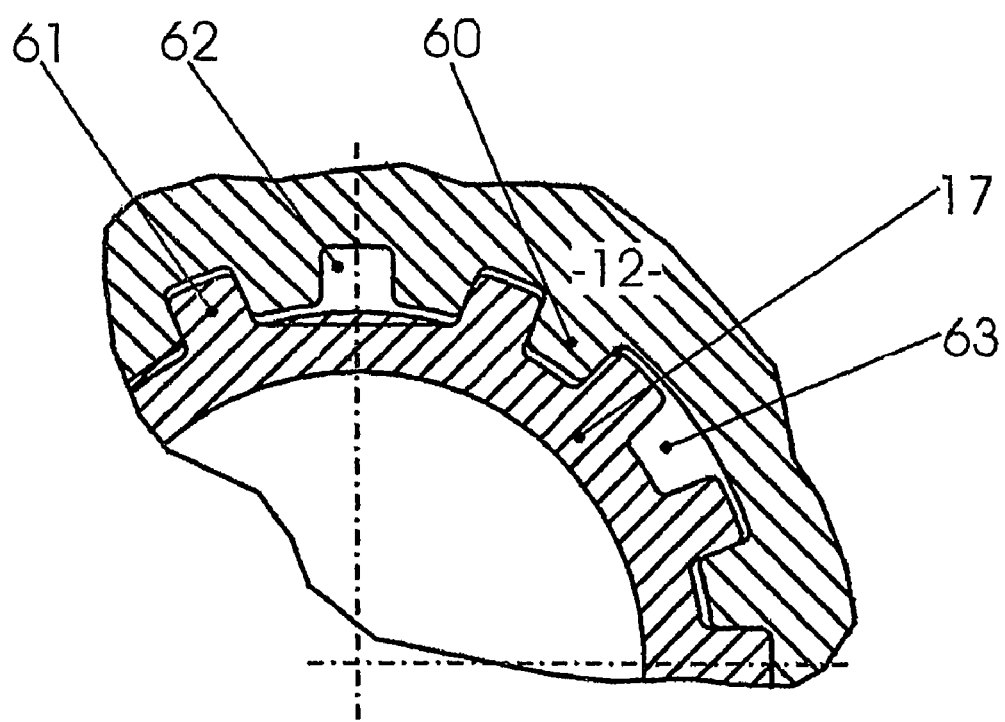
FIG. 4 illustrates a section according to III-III in FIG. 1.

FIG. 4 shows the special-design of the clutch teeth 44 which permits the passage of lubricating oil in the axial direction. The inner clutch part 12 has inwardly projecting clutch teeth 60, the hollow shaft 17 outwardly projecting clutch teeth 61 as with a customary clutch tooth arrangement, with the cross-section of the clutch teeth 60, 61 being as desired, but in particular rectangular or triangular. To permit the passage of lubricating oil, however, individual clutch teeth have been omitted or removed. Either tooth gaps 62 thus arise due to the omission of individual clutch teeth 61 or tooth gaps 63 due to the omission of individual clutch teeth 60.

The description is merely exemplary in nature and, thus, variations that do not depart from the gist of the present disclosure are intended to be within the scope of the invention. Such variations are not to be regarded as a departure from the spirit and scope of the present disclosure.

What is claimed is:

1. A transfer case for motor vehicles, comprising:
a housing;
a primary shaft;
a secondary shaft;
an offset drive connected for rotation with the secondary shaft;
a friction clutch having an outer part fixed for rotation with the primary shaft and an inner part fixed for rotation with the offset drive, the friction clutch can be selectively actuated for channeling off torque from the primary shaft and supplying it via the inner part and the offset drive to the secondary shaft;
two ramp rings which can be rotated relative to one another for actuating the friction clutch and which are located between the friction clutch and the offset drive; and
an oil reservoir fastened in the housing between the friction clutch and the offset drive so as to partly extend around the ramp rings, the oil reservoir has a base with a first opening communicating with the ramp rings, and a guide device which extends into a conveying region of the offset drive and through which lubricating oil conveyed by the offset drive moves into the reservoir.

2. The transfer case of claim 1, wherein the oil reservoir has, in addition to the base, a front wall, a rear wall and an outer peripheral wall, wherein the guide device is arranged at the front wall, and wherein the base has a slot as the first opening which adjoins both ramp rings with the interposition of seals so that lubricating oil moves between them.

3. The transfer case of claim 2, wherein the oil reservoir includes a second opening formed through at least one of the base and the rear wall and through which lubricating oil moves to lubricate a disk pack of the friction clutch.

4. The transfer case of claim 3, wherein a part of the friction clutch facing the second opening has a rotating collection chamber and an outwardly inclined bore leading from the collection chamber to the disk pack.

5. The transfer case of claim 1, wherein the inner clutch part is rotationally fixedly connected to a hollow shaft leading to the offset drive by means of a clutch tooth arrangement, and wherein the clutch tooth arrangement lacks individual teeth, whereby oil passages are defined through which the lubricating oil flows to radial passages in the inner clutch part which lead to a disk pack of the friction clutch.

6. The transfer case of claim 1, wherein an outer peripheral wall of the oil reservoir extends into a centrifugal region of the friction clutch so that oil centrifuged off by the friction clutch moves into the oil reservoir.

7. The transfer case of claim 1, wherein the guide device is at least one scoop.

8. The transfer case of claim 1, wherein the guide device is a crescent-shaped chamber part adjoining the oil reservoir and is bounded at an outside by an extension of an outer peripheral wall, at a side remote from the friction clutch by an end wall and by an inner surface, which is disposed in the conveying region of the offset drive and has slots for collecting centrifuged oil.

9. A transfer case comprising:
a housing;
a primary shaft;
a secondary shaft;
an offset drive connected for rotation with said secondary shaft;
a friction clutch operable for transferring torque from said primary shaft to said secondary shaft through said offset drive;
a pair of ramp rings supported by said primary shaft that rotate relative to each other for actuation of said friction clutch, said ramp rings disposed between said friction clutch and said offset drive; and
an oil reservoir disposed between said friction clutch and said offset drive so as to partially extend around said ramp rings, said reservoir having a first opening in communication with said ramp rings and at least one guide device that extends around a portion of said offset drive, said guide device conveying a lubricating oil from said offset drive into said reservoir.

10. The transfer case of claim 9, wherein said oil reservoir includes a base, a front wall, a rear wall and an outer peripheral wall, said front and rear walls positioned substantially perpendicular to a longitudinal axis of said primary shaft.

11. The transfer case of claim 10, wherein said guide device is arranged at said front wall, and said base has a slot defining said first opening in communication with said ramp rings.

12. The transfer case of claim 10, further comprising a second opening formed in said rear wall of said oil reservoir adjacent to said base for conveying said lubricating oil to said friction clutch.

13. The transfer case of claim 12, wherein said friction clutch includes a disk pack, and wherein a portion of said friction clutch facing said second opening has a rotating collection chamber and an outwardly inclined bore leading to said disk pack.

14. The transfer case of claim 13, wherein said friction clutch includes an inner part that is rotationally fixedly connected to a hollow shaft leading to said offset drive by means of a clutch tooth arrangement, and wherein said clutch tooth arrangement lacks individual teeth to form oil passages through which said lubricating oil flows to radial passages formed in said inner part of said friction clutch that lead to said disk pack.

15. The transfer case of claim 10, wherein said outer peripheral wall of said oil reservoir extends longitudinally beyond said rear wall and into a centrifugal region of said friction clutch so that said lubricating oil may be centrifuged off said friction clutch and directed into said oil reservoir.

16. The transfer case of claim 9, wherein said guide device is formed of at least one scoop.

17. The transfer case of claim 9, wherein said guide device is a crescent-shaped chamber.

18. A transfer case, comprising:
a housing;
first and second shafts;
a friction clutch operably disposed between said first and second shafts;
a clutch actuator for selectively actuating said friction clutch, said actuator including a first ramp ring, a second ramp ring and a mechanism for causing axial movement of said first ramp ring relative to said friction clutch in response to relative rotation between said first and second ramp rings; and
an oil reservoir fixed to said housing so as to partially surround said ramp rings, said reservoir defining a first section overlying said first and second ramp rings and a second section communicating with said first section, said first section maintaining a volume of lubricating oil and having an opening for supplying said oil to said clutch actuator, and said second section is arranged to transfer said oil collected within said housing into said first section.

19. The transfer case of claim 18 further comprising an offset drive connected for rotation with said second shaft such that said friction clutch is operably arranged between said first shaft and said offset drive, and wherein said second section of said oil reservoir is oriented to collect oil discharged in response to rotation of said offset drive.

20. The transfer case of claim 19 wherein said first and second ramp rings are disposed between said friction clutch and said offset drive.

21. The transfer case of claim 19 wherein said offset drive includes a toothed member rotatably supported on said first shaft, wherein said second section of said oil reservoir generally surrounds a portion of said toothed member and includes guides for collecting oil thrown in response to rotation of said toothed member and directing said oil into said first section.

22. The transfer case of claim 18 where in said first section of said oil reservoir includes a base portion through which said opening extends, said base portion arranged to generally surround a portion of said first and second ramp rings.

23. The transfer case of claim 22 further comprising seals disposed between said base portion and said first and second ramp rings to direct said oil to flow between said first and second ramp rings.

24. The transfer case of claim 23 wherein said first and second ramp rings are supported on said first shaft.

25. The transfer case of claim 18 wherein said first section of said oil reservoir includes a second opening for directing said oil to flow toward said friction clutch.

* * * * *